United States Patent
Tzou et al.

(10) Patent No.: US 7,020,155 B2
(45) Date of Patent: Mar. 28, 2006

(54) COLLISION DETECTION METHOD AND APPARATUS FOR MULTIPLE ACCESS COMMUNICATION SYSTEM

(75) Inventors: Ching-Kae Tzou, Hinchu (TW); Shih-Chung Yin, Hinchu (TW); Shuenn-Ren Liu, Taipei (TW); Min-Chieh Chen, Hsinchu (TW)

(73) Assignee: Silicon Integrated Systems, Corp., (TW)

( * ) Notice: Subject to any disclaimer, the term of this patent is extended or adjusted under 35 U.S.C. 154(b) by 900 days.

(21) Appl. No.: 09/964,478

(22) Filed: Sep. 28, 2001

(65) Prior Publication Data

US 2003/0063621 A1   Apr. 3, 2003

(51) Int. Cl.
*H04L 12/413* (2006.01)
(52) U.S. Cl. ...................................... 370/445; 370/462
(58) Field of Classification Search ................ 370/445, 370/447, 448, 461, 462; 375/229, 231, 232, 375/233
See application file for complete search history.

(56) References Cited

U.S. PATENT DOCUMENTS

| | | | |
|---|---|---|---|
| 5,646,958 A | * | 7/1997 | Tsujimoto ................... 375/233 |
| 6,055,268 A | * | 4/2000 | Timm et al. ................. 375/229 |
| 6,067,291 A | * | 5/2000 | Kamerman et al. ......... 370/338 |
| 6,246,693 B1 | * | 6/2001 | Davidson et al. ........... 370/445 |
| 6,539,028 B1 | * | 3/2003 | Soh et al. .................... 370/445 |
| 6,735,217 B1 | * | 5/2004 | Webber et al. .............. 370/447 |
| 2001/0055311 A1 | * | 12/2001 | Trachewsky et al. ....... 370/445 |
| 2003/0002519 A1 | * | 1/2003 | Terry et al. ................. 370/445 |
| 2003/0026283 A1 | * | 2/2003 | Currivan et al. ............ 370/441 |
| 2004/0160976 A1 | * | 8/2004 | Ha et al. ..................... 370/445 |

\* cited by examiner

*Primary Examiner*—Chau Nguyen
*Assistant Examiner*—Anthony Sol
(74) *Attorney, Agent, or Firm*—Lowe Hauptman & Berner, LLP

(57) ABSTRACT

A collision detection method for a multiple access communication system is disclosed. By using the error term of a time-domain equalized signal as a detection source, an operation on the error term can be performed to determine whether collision occurs. For example, the mean square error and/or maximum value of the real part and/or imaginary part of the error term can be calculated or selected to distinguish the collision and non-collision situations. A collision detection apparatus for a multiple access communication system is also disclosed. The collision detection apparatus utilizes an existent adaptive equalizer and signal processing device for obtaining received information data bits to obtain the error term. The error term is further processed by a mean-square-error or maximum-absolute-value operator to determine the collision status.

17 Claims, 9 Drawing Sheets

COLLISION DETECTION METHOD AND APPARATUS FOR MULTIPLE ACCESS COMMUNICATION SYSTEM

FIELD OF THE INVENTION

The present invention relates to a collision detection method, and more particularly to a collision detection method for a multiple access communication system. The present invention also relates to a collision detection apparatus.

BACKGROUND OF THE INVENTION

Collision is an important issue in a typical multiple access communication system. It has been observed experimentally that the throughput will be severely reduced to its half or even further when several stations are accessing a common channel frequently without detecting and preventing from collisions in advance. In other words, a collision-detection operation prior to accessing the common channel and a channel re-access mechanism after collisions occur will improve throughput of a multiple access communication system, for example HomePNA 2.0, significantly.

For HomePNA 2.0, a constant TRN16 sequence is designed to fulfill the purpose of early detection. The receiver end of a HomePNA 2.0 system uses a copy of TRN16 sequence to correlate or match with the received signal and identify unexpected peaks at its output to declare collisions. It typically involves complex numerical operations to implement such correlation means.

As described in "Interface Specification for HomePNA 2.02.7 10M8 Technology", all packets shall consist of a header section in which the PREAMBLE64 is defined as repetition of four 16-symbol sequences so-called as TRN16. FIG. 1 shows the frame structure of HomePNA 2.0 for transmitting/receiving signals. The TRN16 sequence results from encoding 0xfc483084 into a sequence of 4 QAM signal constellations, as shown in FIG. 2, in the order of MSB bit transmitted first at 2 MBaud, 2 bits-per-Baud, with the scrambler disabled. The TRN16 is a pseudo-random, constant amplitude QPSK sequence. The preamble was designed to facilitate the following: (1) power estimation and gain control, (2) baud frequency offset estimation, (3) equalizer training, (4) carrier sense, and (5) collision detection.

Please refer to FIG. 3 which is a schematic block diagram showing a conventional collision detection apparatus. The apparatus interfaced between a station 10 and a system channel 20 includes an adaptive equalizer 11, a signal processing device 12, a match filter 13, a collision detection circuit 14 and a channel accessing device 15. When the apparatus receives a signal, the received signal is transmitted to both of the adaptive equalizer 11 and the match filter 13. The signal equalized by the adaptive equalizer 11 is further transmitted to both of the signal processing device 12 and the match filter 13. In the signal processing device 12, the signal is detected and processed by slicing at epoch n to obtain an error term e(n) which is used to update the equalizer's coefficient adaptively. Meanwhile, the equalized preamble is compared with the originally received one in the match filter 13. The comparing result is outputted to the collision detection circuit 14 to determine whether collisions occur. The channel accessing device 15 then controls whether and when the station 10 can use the system channel 20.

If there is only one station transmitting signal onto the channel, four distinct sharp spikes can be observed by a receiver at its match filter output, as illustrated in FIG. 4A. On the other hand, if an unexpected HomePNA 2.0 type signal in addition to the transmitted signal appears at along front end, the receiver shall observe additional peaks at other symbol instants, as shown in FIG. 4B.

A HomePNA 2.0 compliant system including a transmitter and an associated receiver can use above features to identify collisions at its receiver output when it is transmitting a signal.

Basically, the correlator 13 operates as follows:

$$O(k) = \sum_{n=0}^{15} r(k-n) * c(n)$$

in which c(k); k=0, . . . , 15 denotes the TRN16 sequence.

r(t)=s(k)+i(k)+n(k)=received signal at either equalizer's input or its output sampled at epochs k.

where $s(k)=s_r(k)+js_i(k)$ represents expected signal, $i(k)=i_r(k)+ji_i(k)$ denotes interference, and n(k) is a channel noise.

The timing resolution of a collision can be doubled if the received signal is sampled at twice the symbol rate, and c(k) is interpolated with zero at every other symbol. In this case, the output now becomes $$O(k) = \sum_{n=0}^{31} r_2(k-n) * c_2(n)$$

in which $c_2(k)$; k=0, . . . , 31 denotes the TRN16 sequence interpolated with zero at every other symbol.

$r_2(k)$=received signal at either equalizer's input or its output sampled at twice the symbol rate at epochs k.

The above-mentioned conventional collision detection method, however, requires an additional match filter of complicated circuitry to achieve the purpose of correlation. Accordingly, the cost will be relatively high.

SUMMARY OF THE INVENTION

Therefore, an object of the present invention is to provide a collision detection method for a multiple access communication system, which improves detection probability of collision in a simple and robust way.

Another object of the present invention is to provide a collision detection apparatus for a multiple access communication system, which involves in a simplified circuitry.

An aspect of the present invention relates to a collision detection method for use in a multiple access communication system with a common channel. The method includes steps of transmitting a signal including a predetermined segment to the common channel; receiving the signal from the common channel; processing the signal to obtain an error term associated with the predetermined segment; performing a mathematical operation on the error term to obtain an index value; and determining whether a collision occurs by comparing the index value with a threshold value.

Preferably, the predetermined segment is a preamble of a packet with constant sequence which is provided for collision detection according to the invention. For example, for a HomePNA 2.0 system, the constant sequence is a TRN16 sequence. The error term is obtained by comparing a section of the received packet (i.e. the received TRN16 sequence) with an expected TRN16 sequence.

The index value, for example, can be a mean square value, a maximum absolute value, an Nth order metric of a maximum absolute value or a mean absolute value of a real part or an imaginary part or both of the error term.

Preferably, the error term is obtained by processing the signal on the basis of the constant sequence.

Another aspect of the present invention relates to a collision detection apparatus for use in a multiple access communication system between a station and a common channel. The apparatus includes a signal processing device for receiving a signal including a predetermined segment, and comparing the signal with a predetermined signal to obtain a error term associated with the predetermined segment; a mathematical operator electrically connected to the signal processing device for mathematically operating on the error term to obtain an index value; and a collision detection device electrically connected to the mathematical operator for determining whether a collision occurs according to the index value.

Preferably, the apparatus further includes an adaptive equalizer electrically connected to the signal processing device for adjusting a waveform of the signal according to the error term.

Preferably, the signal processing device processes the signal to simultaneously obtain information data bits of the signal and the series of error term.

Preferably, the error term for subsequent collision detection is further transmitted to the equalizer to update coefficients of the equalizer.

For a HomePNA 2.0 system, the predetermined segment includes four repetitive TRN16 sequences.

In an embodiment, the mathematical operator is a mean-square-value calculator.

In another embodiment, the mathematical operator is a maximum-absolute-value selector.

In a further embodiment, the mathematical operator is a mean absolute-value calculator.

Preferably, the collision detection device is further electrically connected to a channel accessing device to allow the station to access the common channel when the index value is lower than a threshold value to declare no collision.

Preferably, the signal is outputted from a transmitter end of the station, and received at a receiver end of the station to detect the collision status before being transmitted to the common channel.

BRIEF DESCRIPTION OF THE DRAWINGS

The present invention may best be understood through the following description with reference to the accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 5:
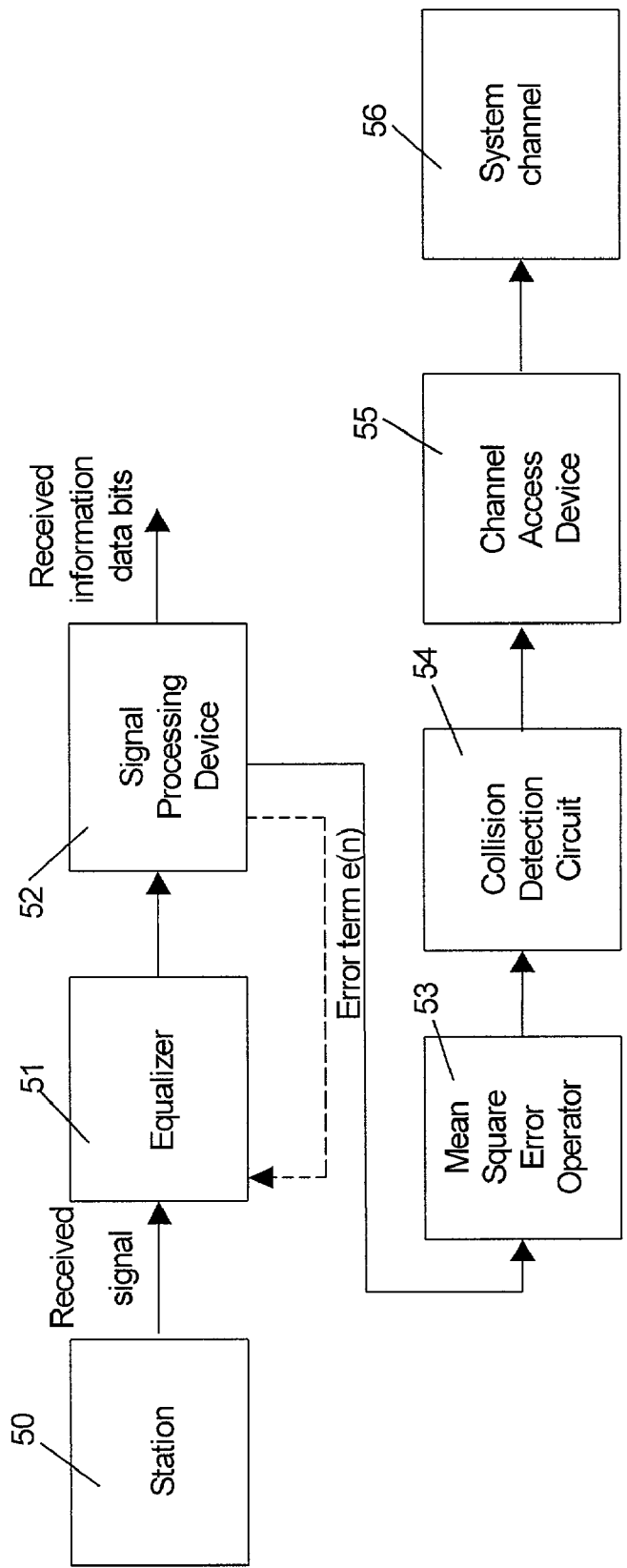
FIG. 5 is a schematic block diagram showing a preferred embodiment of a collision detection apparatus according to the present invention.

Please refer to FIG. 5 which is a schematic block diagram showing a preferred embodiment of a collision detection apparatus according to the present invention. The apparatus interfaced between a station 50 and a system channel 56 includes an equalizer 51, a signal processing device 52, a mean square error (MSE) operator 53, a collision detection circuit 54 and a channel accessing device 55. When the apparatus receives a signal, the received signal is transmitted to the equalizer 51 to be adjusted, and further to the signal processing device 52. In the signal processing device 52, the signal is processed and detected to obtain received information data bits and an error term e(n) by slicing at epoch n. The error term e(n), if required, can be used to update the coefficient of the equalizer 51 adaptively. Meanwhile, the error term e(n) is transmitted to the MSE operator 53 to calculate the amplitude of a mean square error which is provided for the collision detection circuit 54 to determine whether collision occurs.

For a sequence of error samples e(k), k=1, . . . , N, $$MSE = \frac{\sum_{i=1}^{N} e^2(k)}{N}.$$

Then, the channel accessing device 55 controls whether and when the station 50 can use or access the system channel 56 according to a predetermined algorithm.

Figure 1:
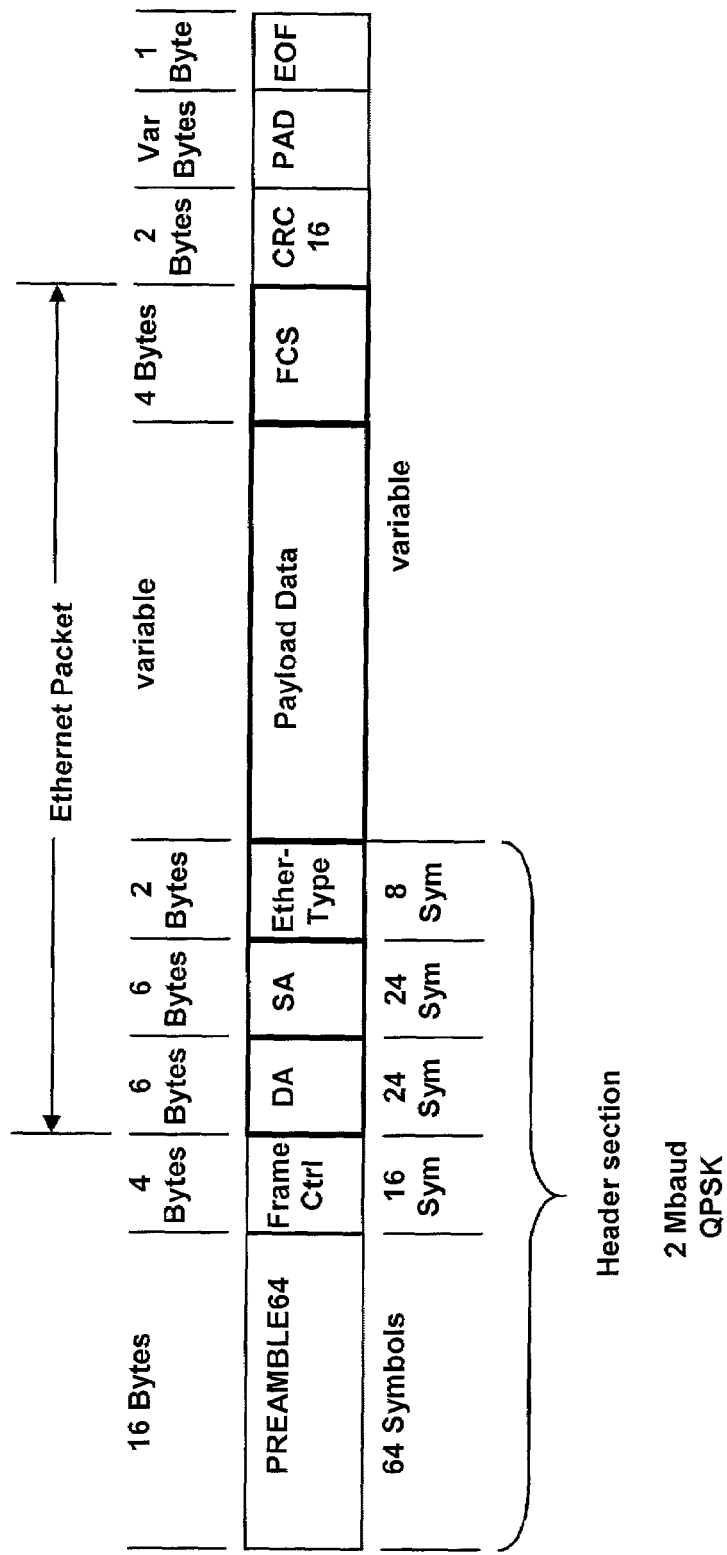
FIG. 1 shows the frame structure of HomePNA 2.0 for transmitting/receiving signals.
Figure 2:
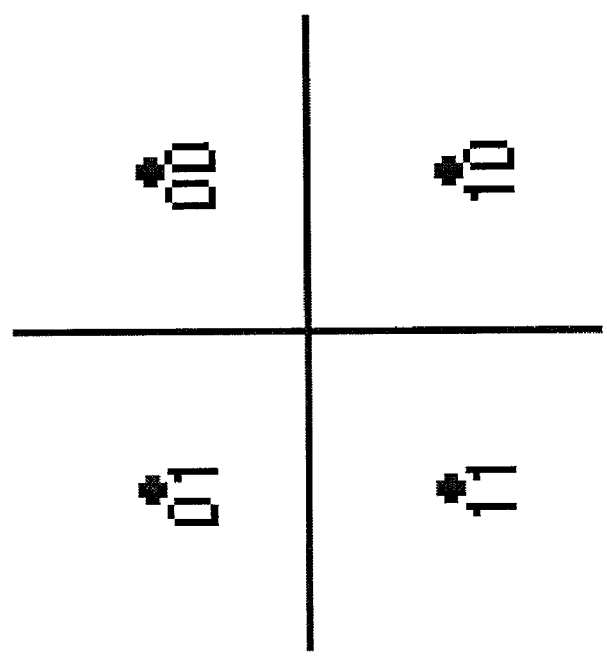
FIG. 2 shows 4 QAM signal constellations (2 bits per Baud)
Figure 3:
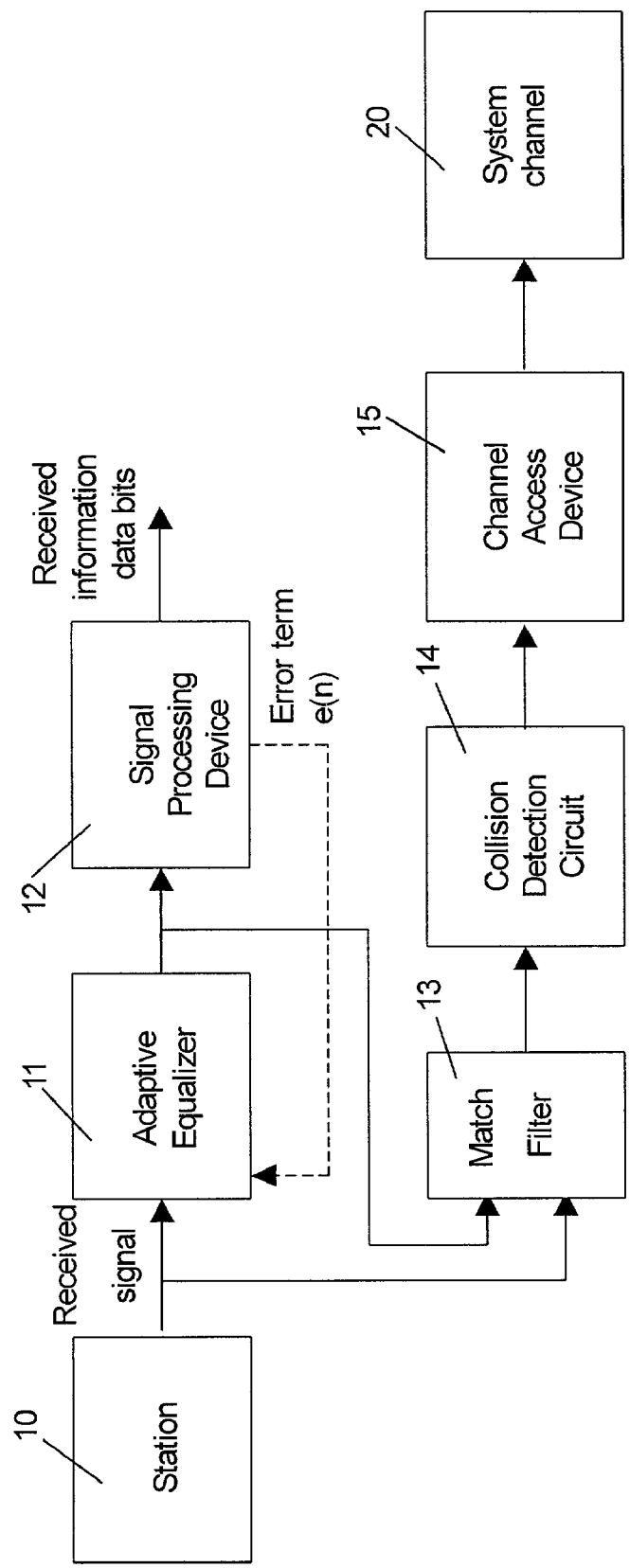
FIG. 3 is a schematic block diagram showing a conventional collision detection apparatus.
Figure 4A:
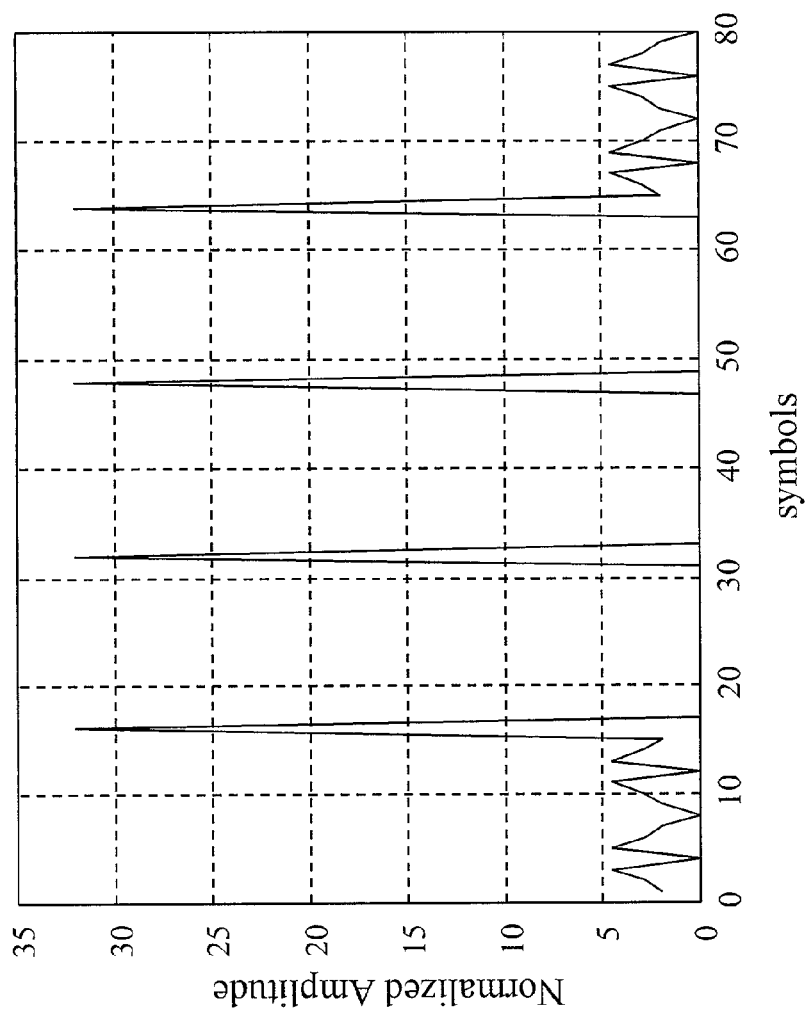
FIGS. 4A and 4B show the outputs of the match filter of FIG. 3 for non-collision and collision situations, respectively.
Figure 4B:
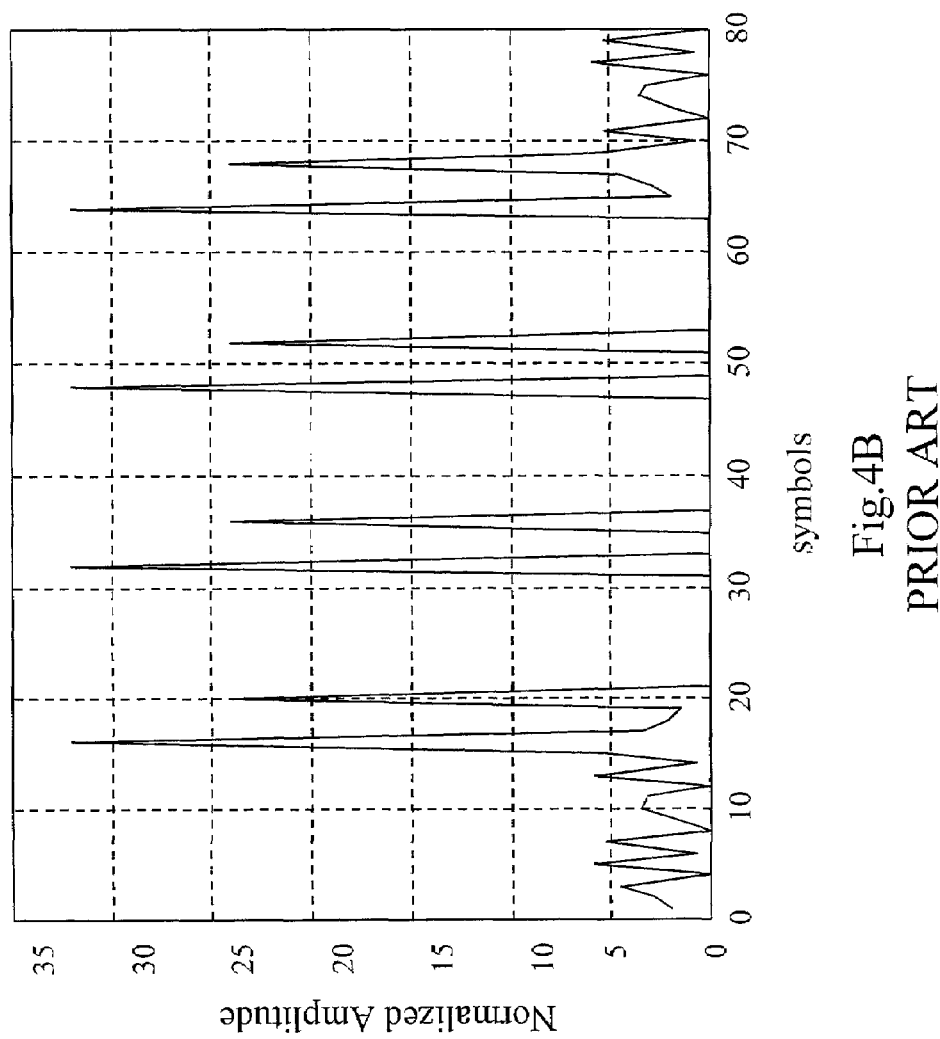

The error term e(n) is defined as a difference between the output value of the equalizer 51 before signal slicing and the expected signal constellations after signal slicing. In Home-PNA 2.0, the expected signal constellations in the periods of preamble and header sections are from a 4-QAM constellation as illustrated in FIG. 2.

A HomePNA 2.0 compliant system including a transmitter and an associated receiver can use above features to identify collisions at its receiver output when it is transmitting a signal.

Figure 6:
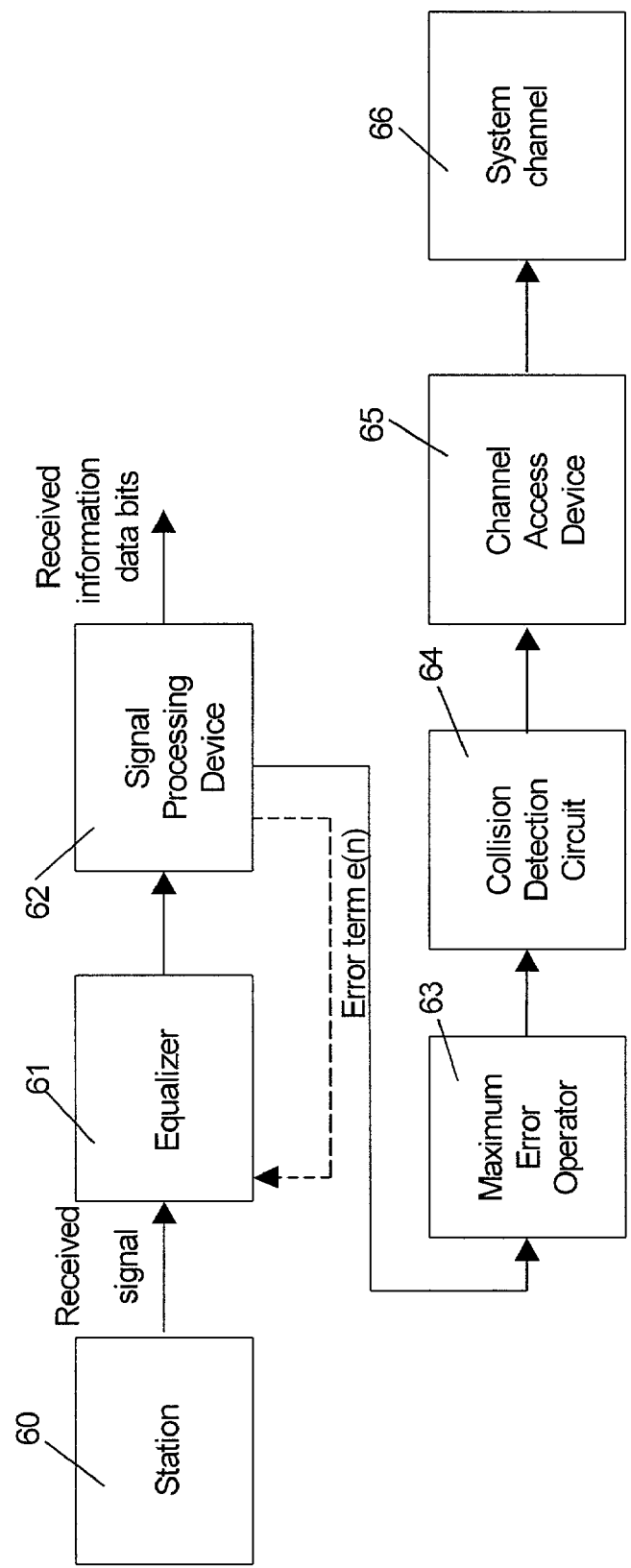
FIG. 6 is a schematic block diagram showing another preferred embodiment of a collision detection apparatus according to the present invention.

Another embodiment of a collision detection apparatus according to the present invention is shown in FIG. 6, which is similar to the apparatus of FIG. 5 except that a maximum error operator 63 substitutes for the MSE operator 53 for processing the error term e(n). The term "maximum absolute value", "maximum absolute error" or "max error" used herein indicates a maximum absolute value of the error term, e.g. a maximum absolute value of the real part of the error term, a maximum absolute value of the imaginary part of the error term, or a maximum absolute value of the combination of the real and imaginary parts of the error term. In other words, for a sequence of error samples e(k), k=1, ..., N, a max error or maximum absolute error or maximum absolute value is the maximum one of the absolute values of error samples, i.e. |e(k)|, k=1, ..., N.

In order to facilitate the understanding of this invention, examples are given as follows.

EXAMPLE 1

Two stations A and B are used to illustrate a 2-station test. An automatic waveform generator (AWG; not shown) is tapped to the channel at the front end of the station B for simulating the collision detection situation. The station A randomly transmits HomePNA 2.0 packets, and an internal "carrier-sense" signal of the station B is probed to trigger the AWG to output pre-stored HomePNA 2.0 packets and thus generate interfering signals in a controlled way.

Figure 7B:
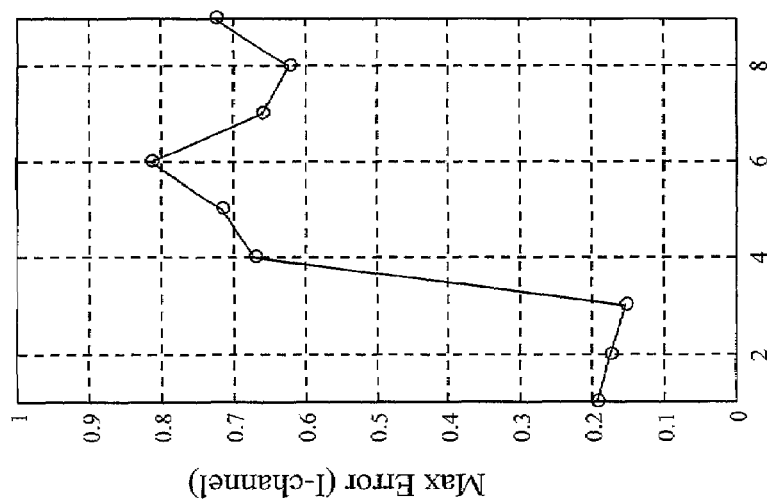
FIG. 7B shows two-station test experimental results by using the apparatus of FIG. 6.
Figure 7A:
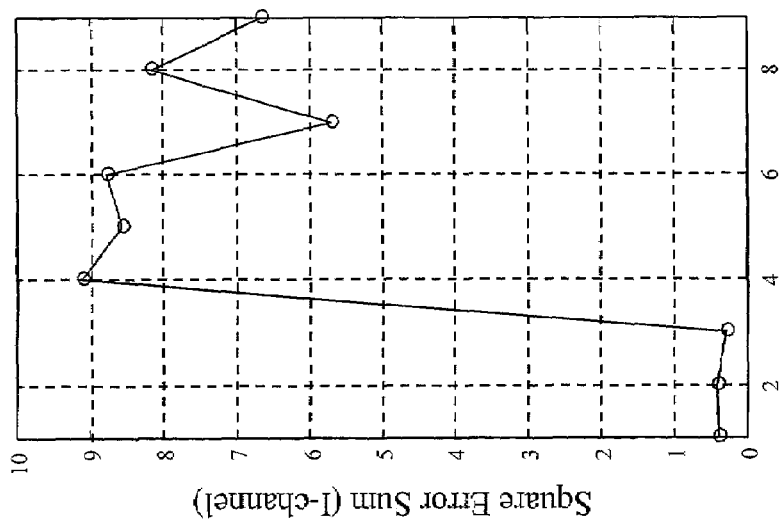
FIG. 7A shows two-station test experimental results by using the apparatus of FIG. 5.

Nine cases described as follows are detected via both of the apparatus of FIGS. 5 and 6, and the output plots are shown in FIGS. 7A and 7B, respectively, wherein the operations are performed for the I-channel, i.e. the real part of the error term.

Case 1: Normal packet transmission without collision. The AWG is not triggered to transmit any interfering signals.
Case 2: Normal packet transmission without collision. The AWG is not triggered to transmit any interfering signals.
Case 3: Normal packet transmission without collision. The AWG is not triggered to transmit any interfering signals.
Case 4: Packet transmission with collision. The AWG is triggered to output packets with an amplitude of 0.1 Volts peak-to-peak.
Case 5: Packet transmission with collision. The AWG is triggered to output packets with an amplitude of 0.2 Volts peak-to-peak.
Case 6: Packet transmission with collision. The AWG is triggered to output packets with an amplitude of 0.3 Volts peak-to-peak.
Case 7: Packet transmission with collision. The AWG is triggered to output packets with an amplitude of 0.4 Volts peak-to-peak.
Case 8: Packet transmission with collision. The AWG is triggered to transmit packets with an amplitude of 0.5 Volts peak-to-peak.
Case 9: Packet transmission with collision. The AWG is triggered to transmit packets with an amplitude of 0.6 Volts peak-to-peak.

As shown, it is obvious that the difference between MSEs or MEs without collisions (Case 1~3) and those with collisions (case 4~9) is significant. It is easy for station B to set a threshold and distinguish above collision and no-collision situations and declare collisions when necessary.

EXAMPLE 2

The test of example 1 is repeated with six stations A, B, C, D, E, F connected together by using a daisy-chain topology, i.e., A→B→C→D→E→F. The AWG is connected to the channel at the front end of, for example, Station F, for the purpose of simulation. Station A transmits packets, and carrier sense of, for example, Station D is probed to trigger the AWG to output interfering packet fragments when necessary.

Figure 8B:
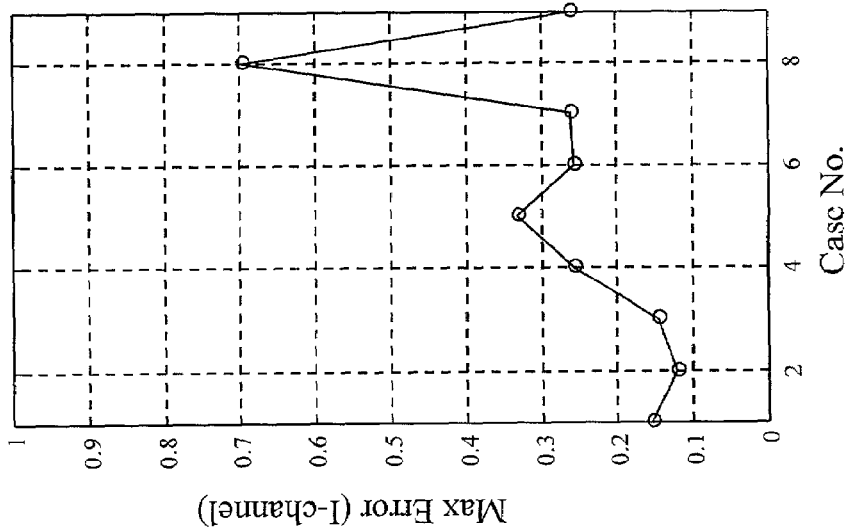
FIG. 8B shows six-station test experimental results by using the apparatus of FIG. 6.
Figure 8A:
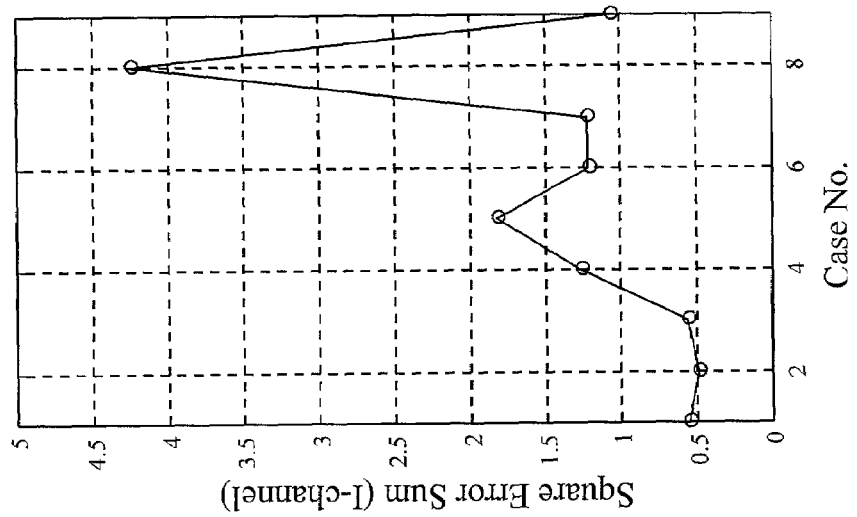
FIG. 8A shows six-station test experimental results by using the apparatus of FIG. 5.

Nine cases described below are detected via both of the apparatus of FIGS. 5 and 6, and the output plots are shown in FIGS. 8A and 8B, respectively, wherein operations are performed for the I-channel, i.e. the real part of the error term.

Case 1: Normal packet transmission without collision. The AWG is not triggered to output any interfering signals.
Case 2: Normal packet transmission without collision. The AWG is no triggered to transmit interfering signals.
Case 3: Normal packet transmission without collision. The AWG is not triggered to transmit interfering signals.
Case 4: Packet transmission with collision. The AWG is triggered to transmit packets with an amplitude of 0.3 Volts peak-to-peak.
Case 5: Packet transmission with collision. The AWG is triggered to transmit packets with an amplitude of 0.4 Volt peak-to-peak.
Case 6: Packet transmission with collisions. The AWG is triggered to transmit packets with an amplitude of 0.5 Volts peak-to-peak.
Case 7: Packet transmission with collisions. The AWG is triggered to transmit packets with an amplitude of 0.6 Volts peak-to-peak.
Case 8: Packet transmission with collisions. The AWG is triggered to transmit packets with an amplitude of 0.7 Volts peak-to-peak.
Case 9: Packet transmission with collisions. The AWG is triggered to transmit packets with an amplitude of 0.8 Volts peak-to-peak.

The MSEs or MEs of, for example, at Station F for these cases are measured. As shown, it is obvious that the difference between MSEs or MEs without collisions (Case 1~3) and those with collisions (case 4~9) is significant enough to determine any collision when a threshold is properly selected. Although not shown in the figures, the collision detection scheme is quite robust to amplitude variations in signal of interest in this example.

The above experimental results are applicable to other stations, especially for the source station that is transmitting signals to other stations. The transmitting station can receive echoes of its own transmitted signal, and observe MSE or ME values at its own receiver end. A pre-set threshold can be used to detect and declare collision if there is any. When a collision happens, the source station can disable the transmission as early as possible like that defined in HomePNA 2.0 specification and increase overall system throughput of the whole network.

It is to be understood that a square-and-sum circuit has been implemented for averaged slicer mean-square-error (ASMSE) measurement during the payload period as required by HomePNA 2.0 Link Layer specification. The same square-and-sum circuit can be used in the collision detection apparatus according to the present invention with the addition of a simple decision circuit so as to simplify the circuit structure.

On the other hand, the maximum-absolute-value selection and comparison is also an easy mechanism to implement from the view of hardware area. The maximum value during the header period can be recorded and compared with a pre-set threshold to declare any collision. The hardware of collision detection in this case reduces to a simple maximum selection and comparison circuit.

The MSE, either the real part or the imaginary part or the combination thereof, is measured over but not limited to a certain period, typically from "frame-control" to "ethernet-type" of the header section, and used as a basis for collision detection, as mentioned above.

Likewise, the maximum-absolute-value selection of the real part and/or the imaginary part thereof is performed over but not limited to a certain period, typically from "frame-control" to "ethernet-type" of the header section, and used as a basis for collision detection, as mentioned above.

To further improve collision detection reliability, CRC value of the header information can be checked and, if there is any error detected, collision is also declared.

Although a mean square error and a maximum error are exemplified to illustrate the collision detection method of the present invention as above, other error metrics may apply here to achieve the same purpose. For example, a mean absolute value of the error term defined as $$\frac{\sum_{i=1}^{N}|e(k)|}{N}$$

for a sequence of error samples e(k), k=1, ..., N is one of them. In general, an $N^{th}$ order metric of the error term defined as $|e(n)|^N$ will work, where N is an integer and |x| denotes the absolute value of x. An average or mean value associated with one of these $|e(n)|^N$ will also work. Any combination of the above items will still work.

According to the present invention, the collision detection can be performed to improve detection probability of collision in a simple and robust way. The present collision detection method and device can be easily adapted and incorporated in all digital communication systems that incorporate multiple access protocols for channel accessing.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A collision detection method for use in a multiple access communication system with a common channel, comprising steps of:
    transmitting a signal including a preamble of a packet with a TRN16 sequence to said common channel;
    receiving said signal from said common channel;
    processing said signal to obtain an error term that is obtained by comparing said received TRN16 sequence with an expected TRN16 sequence;
    performing a mathematical operation on said error term to obtain an index value; and determining whether a collision occurs by comparing said index value with a threshold value.

2. The collision detection method according to claim 1 wherein said index value is a mean square value of said error term.

3. The collision detection method according to claim 1 wherein said index value is a maximum absolute value of said error term.

4. The collision detection method according to claim 1 wherein said index value is a mean absolute value of said error term.

5. The collision detection method according to claim 1 wherein said index value is an Nth order metric of said error term.

6. The collision detection method according to claim 1 wherein said error term is mathematically operated by using a real part thereof.

7. The collision detection method according to claim 1 wherein said error term is mathematically operated by using an imaginary part thereof.

8. The collision detection method according to claim 1 wherein said error term is mathematically operated by using a combination of a real part and an imaginary part thereof.

9. A collision detection apparatus for use in a multiple access communication system between a station and a common channel, comprising:
    a signal processing device for receiving a signal including a TRN16 sequence and comparing said received TRN16 sequence with an expected TRN16 sequence to obtain an error term;
    a mathematical operator electrically connected to said signal processing device for mathematically operating said error term to obtain an index value; and
    a collision detection device electrically connected to said mathematical operator for determining whether a collision occurs according to said index value.

10. The apparatus according to claim 9 wherein said signal processing device processes said signal to obtain information data bits of said signal and said error term.

11. The apparatus according to claim 10 further comprising an adaptive equalizer electrically connected to said signal processing device for adjusting a waveform of said signal according to said error term.

12. The apparatus according to claim 9 wherein said mathematical operator is a mean-square-value calculator.

13. The apparatus according to claim 9 wherein said mathematical operator is a maximum-absolute-value selector.

14. The apparatus according to claim 9 wherein said collision detection device is further electrically connected to a channel accessing device to allow said station to access said common channel when no collision is determined.

15. The apparatus according to claim 9 wherein said collision detection device determines that said collision occurs when said index value is greater than a threshold value.

16. The apparatus according to claim 9 mounted at a receiver end of said station.

17. The apparatus according to claim 16 wherein said signal is outputted from a transmitter end of the same station.

* * * * *